United States Patent
Pichaimurthy et al.

(10) Patent No.: US 12,073,849 B2
(45) Date of Patent: *Aug. 27, 2024

(54) SYSTEMS AND METHODS FOR FILTERING UNWANTED SOUNDS FROM A CONFERENCE CALL

(71) Applicant: Rovi Guides, Inc., San Jose, CA (US)

(72) Inventors: Rajendran Pichaimurthy, Karnataka (IN); Madhusudhan Seetharam, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/376,725

(22) Filed: Oct. 4, 2023

(65) Prior Publication Data
US 2024/0029753 A1   Jan. 25, 2024

Related U.S. Application Data

(63) Continuation of application No. 17/015,830, filed on Sep. 9, 2020, now Pat. No. 11,817,113.

(51) Int. Cl.
| | |
|---|---|
| G10L 21/028 | (2013.01) |
| G10L 15/26 | (2006.01) |
| G10L 21/0232 | (2013.01) |
| G10L 25/84 | (2013.01) |
| H04M 3/22 | (2006.01) |
| H04M 3/56 | (2006.01) |
| G10L 21/0208 | (2013.01) |

(52) U.S. Cl.
CPC .......... *G10L 21/0232* (2013.01); *G10L 15/26* (2013.01); *G10L 21/028* (2013.01); *G10L 25/84* (2013.01); *H04M 3/2236* (2013.01); *H04M 3/568* (2013.01); *G10L 2021/02087* (2013.01); *H04M 2203/5072* (2013.01)

(58) Field of Classification Search
CPC ............................ G10L 21/028; H04M 3/568
See application file for complete search history.

(56) References Cited

U.S. PATENT DOCUMENTS

| | | |
|---|---|---|
| 8,370,142 B2 | 2/2013 | Frankel et al. |
| 10,516,777 B1 | 12/2019 | Kalkundrikar et al. |
| 10,593,334 B2 | 3/2020 | Xiong |
| 11,450,334 B2 | 9/2022 | Pichaimurthy et al. |
| 11,810,585 B2 | 11/2023 | Pichaimurthy et al. |
| 11,817,113 B2 | 11/2023 | Pichaimurthy et al. |

(Continued)

*Primary Examiner* — Bryan S Blankenagel
(74) *Attorney, Agent, or Firm* — Haley Guiliano LLP

(57) ABSTRACT

To filter unwanted sounds from a conference call, a voice profile of a first user is generated based on a first voice signal captured by a media device during a first conference call. The voice profile may be generated by identifying a base frequency of the first voice signal and determining a plurality of voice characteristics, such as pitch, intonation, accent, loudness, and speech rate. These data may be stored in association with the first user. During a second conference call, a second voice signal captured by the media device is analyzed to determine, based on the voice profile of the first user, whether the second voice signal includes the voice of a second user. If so, the second voice signal is prevented from being transmitted into the conference call. A voice profile of the second user may be generated from the second voice signal for future use.

20 Claims, 12 Drawing Sheets

(56) References Cited

U.S. PATENT DOCUMENTS

| | | |
|---|---|---|
| 2005/0129185 A1 | 6/2005 | McClelland et al. |
| 2009/0214016 A1 | 8/2009 | O'Sullivan et al. |
| 2011/0317825 A1* | 12/2011 | Baird ...................... H04M 3/40 |
| | | 379/202.01 |
| 2013/0051543 A1 | 2/2013 | McDysan et al. |
| 2015/0111615 A1 | 4/2015 | Chu et al. |
| 2016/0028895 A1 | 1/2016 | Bell et al. |
| 2017/0076713 A1 | 3/2017 | Gildein et al. |
| 2017/0099390 A1* | 4/2017 | Crowe ................ H04M 3/5175 |
| 2019/0028591 A1 | 1/2019 | Kumar et al. |
| 2020/0036543 A1 | 1/2020 | Suhail et al. |
| 2020/0106813 A1 | 4/2020 | Vendrow et al. |
| 2020/0194006 A1 | 6/2020 | Grancharov et al. |
| 2020/0401466 A1 | 12/2020 | Frost et al. |
| 2021/0090575 A1 | 3/2021 | Mahmood et al. |
| 2021/0160242 A1 | 5/2021 | McKnight et al. |
| 2021/0210116 A1 | 7/2021 | Gupta |
| 2021/0359872 A1 | 11/2021 | Deole et al. |
| 2021/0407523 A1 | 12/2021 | Perero Codosero et al. |
| 2022/0060525 A1 | 2/2022 | Chavez et al. |
| 2022/0076686 A1 | 3/2022 | Pichaimurthy et al. |
| 2022/0076689 A1 | 3/2022 | Pichaimurthy et al. |
| 2022/0383888 A1 | 12/2022 | Pichaimurthy et al. |
| 2024/0046943 A1 | 2/2024 | Pichaimurthy et al. |

* cited by examiner

SYSTEMS AND METHODS FOR FILTERING UNWANTED SOUNDS FROM A CONFERENCE CALL

CROSS-REFERENCE TO RELATED APPLICATIONS

This application is a continuation of U.S. patent application Ser. No. 17/015,830, filed Sep. 9, 2020, the disclosure of which is hereby incorporated by reference herein in its entirety.

BACKGROUND

This disclosure is directed to audio processing of conference calls. In particular, techniques are disclosed for identifying and filtering out unwanted sounds from a conference call.

SUMMARY

Audio, video, and virtual conferencing continue to play an important role in business and school environments. With many participants in such conferences located remotely from each other, often in places that do not afford them quiet or uninterrupted time to participate in conferences, unwanted sounds can often be heard on the conferences. One way to prevent transmission of such unwanted sounds is to perform active noise cancellation. However, this usually requires additional microphones to determine which sounds are made by a participant and which sounds are made by other sources. Many devices used by conference participants, or participants in any audio or video call, do not include multiple microphones and may not have the processing capabilities to perform active noise cancellation.

Systems and methods are disclosed herein for filtering unwanted sounds from a conference call. A voice profile of a first user is generated based on a first voice signal captured by a media device during a first conference call. The voice profile may be generated by identifying a base frequency of the first voice signal and determining a plurality of voice characteristics, such as pitch, intonation, accent, loudness, and speech rate. These data may be stored in association with the first user. During a second conference call, a second voice signal captured by the media device is analyzed to determine, based on the voice profile of the first user, whether the second voice signal includes the voice of a second user. If so, the second voice signal is prevented from being transmitted into the conference call. A voice profile of the second user may be generated from the second voice signal for future use.

In some embodiments, the second voice signal is captured using a microphone. In order to prevent the second voice signal from being transmitted into the conference call, the microphone may be muted for a predetermined period of time. Alternatively, transmission of captured audio into the conference call may be prevented for the predetermined period of time. After the predetermined period of time passes, a third voice signal may be captured and analyzed by the media device. If it is determined that the third voice signal no longer includes the second voice, the third voice signal is allowed to be transmitted into the conference call. In some embodiments, rather than waiting a predetermined period of time, audio may be continuously sampled. Once the sampled audio is determined to no longer include the voice of the second user, the microphone may be unmuted and/or transmission of the voice signal into the conference call may be permitted.

Other methods of generating voice profiles may also be employed. For example, the first voice signal may be transcribed into corresponding text. Subject matter of the text is then identified and compared with a user profile associated with a first user. The user profile may contain a list of subjects with which the first user is familiar. If the identified subject matter matches a subject on the list of subjects, then the first voice signal is identified as corresponding to the first user. As another example, after transcribing the first voice signal into corresponding text, the text may be processed to determine a language usage level. For example, a language usage level may be based on vocabulary (e.g., size and/or complexity of words), rate of speech, grammatical structures, or other linguistic features. On average, a child will have a lower language usage level than an adult. Thus, the language usage level can be used to estimate the age of the speaker. The usage level is compared with the age of the first user. If the usage level matches the age of the first user, then the first voice signal is identified as corresponding to the first user.

Unwanted sounds may be filtered from a conference call using speech synthesis. A first voice signal is captured by a first device during a conference call. The first voice signal is converted into corresponding text, which is then analyzed to determine that a first portion of the text was spoken by a first user and a second portion of the text was spoken by a second user. The relevance of each identified user to the conference call is determined. If the first user is relevant to the conference call while the second user is not, the first voice signal is prevented from being transmitted into the conference call, the first portion of text is converted into a second voice signal using a voice profile of the first user to synthesize the voice of the first user, and the second voice signal is then transmitted into the conference call. The second portion of text is not converted into a voice signal, as the second user is not relevant to the conference call.

To determine whether a user is relevant to the conference call, a profile of each user is retrieved. A subject of the conference call is identified, and it is determined, based on the profiles, whether each user is familiar with the subject of the conference call. If the first user is familiar with the subject of the conference call, then the first user is deemed relevant to the conference call. If, on the other hand, the second user is not familiar with the subject of the conference call, then the second user is not relevant to the conference call, and the text spoken by the second user need not be converted into a voice signal. Another way to determine whether a user is relevant to the conference call is to determine whether the user received an invitation to the conference call. If a user did not receive an invitation to the conference call, then that user is not relevant to the conference call, whereas a user that was invited to the conference call is relevant to the conference call.

If both the first and second users are determined to be relevant to the conference call, then, in addition to converting the first portion of text into a second voice signal that synthesizes the voice of the first user, the second portion of text is also converted into a third voice signal that synthesizes the voice of the second user. These two voice signals are then transmitted separately into the conference call. In some embodiments, other participants in the conference call are presented with an option to select whether to listen to the second voice signal or the third voice signal. In some embodiments, where both voice signals are transmitted into the conference call, a user interface element, such as a dialog box, may be presented to other participants in the conference call allowing each user to select to which of the two voice signals he or she would like to listen. In some cases, the transcribed text may be transmitted to a remote server at which the voice synthesis occurs. This may reduce the load on the media device to allow for a smoother call experience (e.g., less video or audio buffering).

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
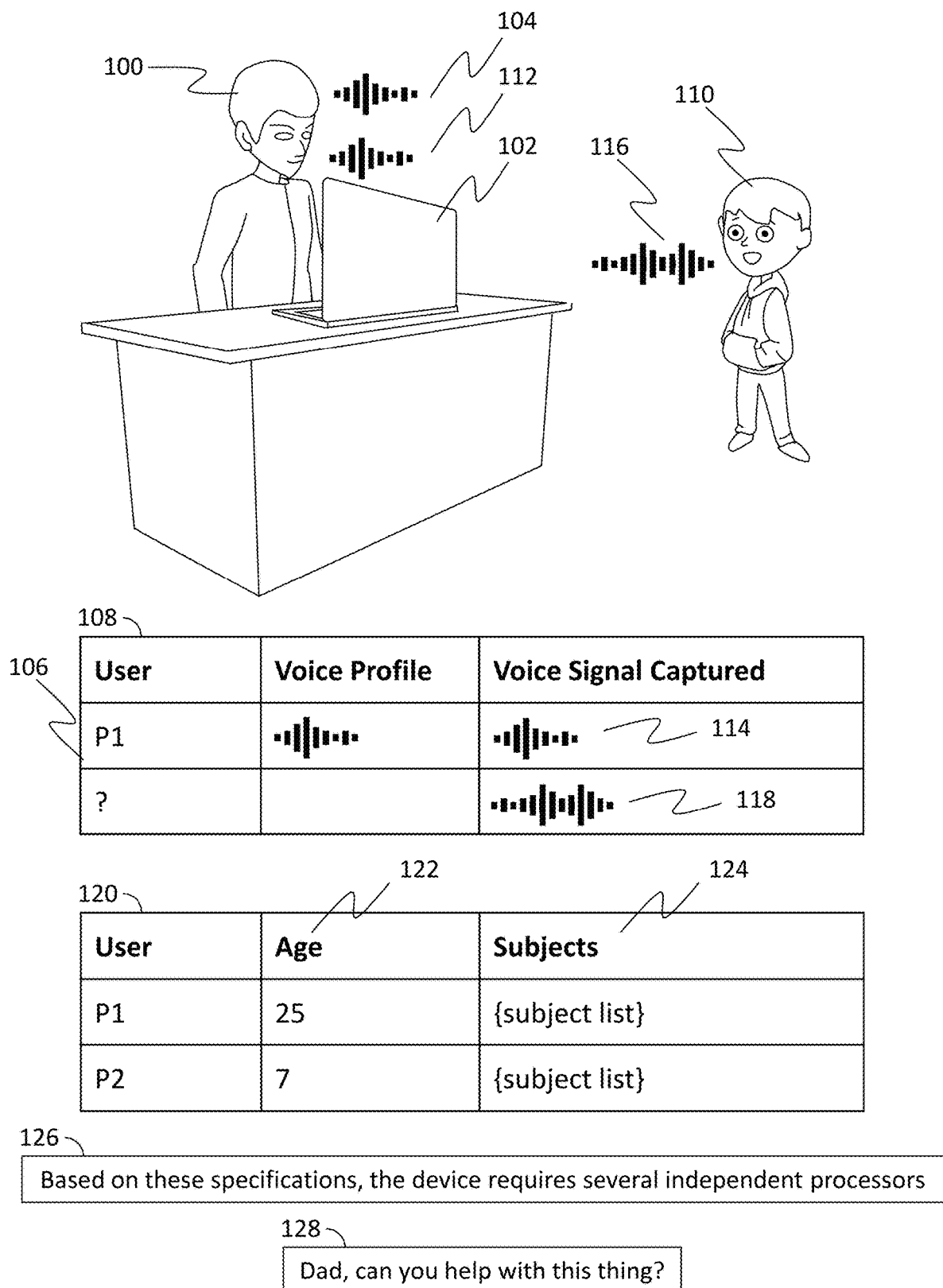
FIG. 1 shows (a) an exemplary scenario in which unwanted sounds are present during a conference call, and (b) data associated with each sound, in accordance with some embodiments of the disclosure.

FIG. 1 shows (a) an exemplary scenario in which unwanted sounds are present during a conference call, and (b) data associated with each sound, in accordance with some embodiments of the disclosure. User P1 100 is participating in a conference call using media device 102. For example, media device 102 may be a phone, a cell phone, a smartphone, a tablet, a laptop computer, a desktop computer, or any other device capable of being used to participate in an audio or video call. During a prior conference call, a voice signal 104 corresponding to the voice of P1 100 was used to generate a voice profile 106 of P1, which is stored in profile list or database 108. For example, a one- or two-second sample of the voice of P1 100 may have been captured and used to generate a voice profile. In some cases, several such samples may be captured, and an average of each voice characteristic identified therein used to generate the voice profile of P1. Alternatively or additionally, media device 102 may prompt P1 100 to train media device 102 to recognize his or her voice. P1 100 may, for example, be prompted by media device 102 to read a predefined passage of text. Media device 102 may build a voice profile of P1 100 based on audio captured while P1 100 reads the passage of text.

During the current conference call, a second person P2 110 enters the vicinity of P1 100, such that sounds made by P2 110 may be picked up by media device 102 and transmitted into the conference call. First voice signal 112 is captured by media device 102 and compared to stored voice profiles in profile list 108. Based on the comparison, media device 102 determines that voice signal 112 matches voice profile 106 of P1 100. Media device 102 may store the captured voice signal 112 in a data field 114 associated with voice profile 106. Voice signal 112 is allowed to be transmitted into the conference call because it matches the voice profile 106 of P1 100.

Second voice signal 116 is also captured by media device 102. Voice signal 116 was generated by P2 110. For example, second voice signal 116 may be captured immediately prior to, or immediately following, first voice signal 112. Media device 102 compares voice signal 116 to known voice profiles in profile list 108. Media device 102 determines that voice signal 116 does not match any known voice profiles. Media device 102 may nevertheless track the captured voice signal 116 in a data field 118 associated with an unknown user. Since it does not match voice profile 106 of P1 100, voice signal 116 is not allowed to be transmitted into the conference call. In another example, second voice signal 116 is captured concurrently with first voice signal 112. Media device 102 may determine that additional sounds that do not correspond to the voice profile of P1 100 are contained in the concurrently captured audio, and prevent transmission of the captured audio into the conference call. Media device 102 prevents transmission by, for example, muting a microphone of media device 102 for a predetermined period of time, such as 5 seconds. After the predetermined period of time, media device 102 may determine if voice signals that do not match voice profile 106 are still present. If so, media device 102 may wait for additional time. If not, media device 102 may allow voice signals to be transmitted into the conference call again. For example, P1 100 speaks for five seconds. The corresponding voice signal is transmitted into the conference call. P2 110 then speaks for ten seconds. Recognizing that the voice of P2 110 does not match the voice profile of P1 100, media device 102 prevents transmission of captured audio data, or mutes the microphone of media device 102, for the predetermined period of five seconds. After five seconds, media device 102 again determines that a voice other than that of P1 100 is speaking, and again prevents transmission of captured audio data, or mutes a microphone of media device 102, for an additional five seconds.

Another method of filtering unwanted sounds may be accomplished by transcribing a voice signal into corresponding text. Media device 102 may transcribe voice signal 112 into corresponding text. Using natural language processing, media device 102 may determine a language usage level. For example, if only small, simple words are used, the language usage level is determined to be low, like that of a young child. If larger and/or technical words are used, the language usage level is determined to be higher, like that of an educated adult. Media device 102 may compare the language usage level with user profile data 120. User profile data 120 includes age data 122 for each user. For example, P1 100 may be twenty-five years old, while P2 110 is only seven years old. Based on the context of the conference call, media device 102 may determine which portion of the transcribed text should be transmitted into the conference call. For example, if the conference call is a business meeting, text spoken by P1 may be transmitted, while if the conference call is a school class session text spoken by P2 may be transmitted. Alternatively or additionally, media device 102 may determine a subject matter of each portion of the text. User profile data 120 may also include subjects data 124, which lists the subjects with which each user is familiar. If the subject of the text matches a subject of the conference call, that portion of the text is allowed to be transmitted.

For example, P1 100 may be participating in a conference call related to engineering a device. P1 100 may say "Based on these specifications, the device requires several independent processors," which is transcribed into text 126. P2 110 may then say "Dad, can you help with this thing?" which is transcribed into text 128. Media device 102 may process text 126 and identify the complexity of the words contained in text 126, such as "specifications," "device," and "independent." Media device 102 may determine that these are complex words based on length and average usage of each word in normal speech. Media device 102 may determine that the speaker of text 126—P1 100—has a high language usage level, indicating that P1 100 is between 24 and 40 years old. Media device 102 may similarly process text 128 and determine that the words contained in text 128 are relatively simple words or phrases. For example, the phrase "this thing" is an indefinite phrase that is more likely to be used by a child to describe an object than by an adult, who would be more likely to use a more exact term to describe the object. Additionally, media device 102 may determine that text 128 is a question posed to another individual identified by the speaker as "Dad." This may also serve to indicate a low language usage level, as children are more likely to address simple questions to their parents than are adults. Media device 102 may then determine that the speaker of text 128—P2 110—has a low language usage level, indicating that P2 110 is a child between 5 and 10 years old.

Figure 2:
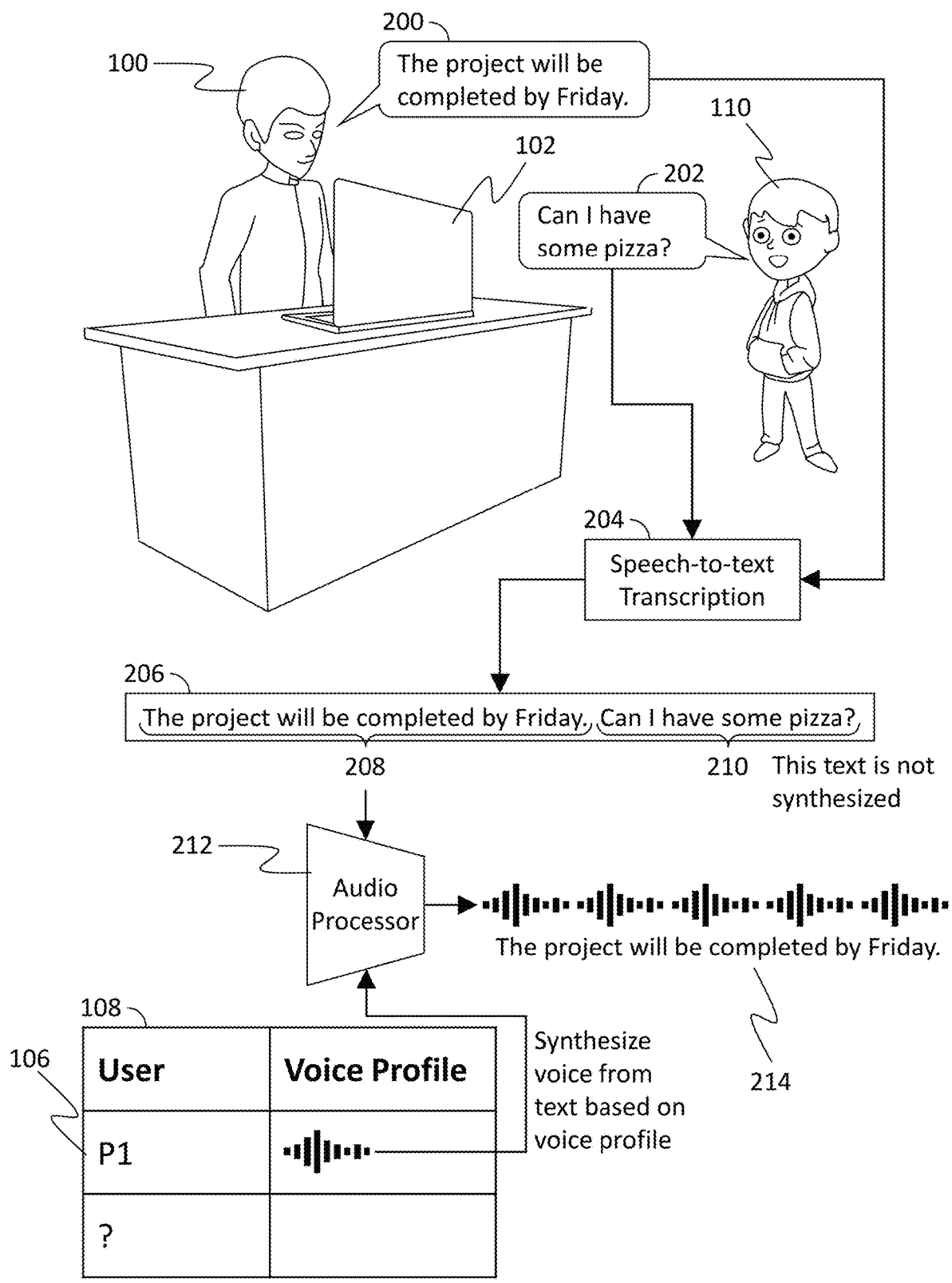
FIG. 2 shows an exemplary scenario in which transcribed text of a voice signal is synthesized in the voice of a user, in accordance with some embodiments of the disclosure.

FIG. 2 shows an exemplary scenario in which transcribed text of a voice signal is synthesized in the voice of a user, in accordance with some embodiments of the disclosure. To transmit the text into the conference call, media device 102 may retrieve a voice profile of the user that spoke the portion of text. Using the voice profile, media device 102 may synthesize the voice of that user into a second voice signal. Methods of synthesizing a voice are described in commonly assigned U.S. patent application Ser. No. 15/931,074, entitled "Systems and Methods for Generating Synthesized Speech Responses to Voice Inputs," filed May 13, 2020, which is hereby incorporated herein by reference in its entirety. Media device 102 then transmits the second voice signal into the conference call. In some embodiments, the transcribed text may be transmitted by media device 102 and synthesized in the voice of the user by a server associated with the conference call, or by participant media devices.

Media device 102 may, simultaneously or in sequence, capture voice signal 200 and voice signal 202. Voice signal 200 may represent speech of P1 100 and voice signal 202 may represent speech of P2 110. For example, P1 100 may be participating in a conference call and may say "The project will be completed by Friday." P2 110 may, simultaneously with P1 100, or right before or right after P1 100 speaks, say "Can I have some pizza?" Media device 102, using speech-to-text transcription engine 204, transcribes the combined voice signal into corresponding text 206 and, using natural language processing, determines whether a portion of the text was spoken by a first user and another portion of the text was spoken by a second user. Each portion of the text may be analyzed separately to determine which portion should be transmitted into the conference call. For example, media device 102 may identify portion 208 corresponding to the speech of P1 100 and portion 210 corresponding to the speech of P2 110. The portions may be identified based on context, such as subject matter of each portion, language usage level of each portion, or voice characteristics of each portion. Media device 102 may determine that portion 208 was spoken by P1 100 and/or is relevant to the conference call. For example, the subject matter of each portion of text may be compared to a user profile listing subjects with which each respective user is familiar. If the subject matter of a portion matches the list of subjects for a particular user, that user may be identified as the speaker of that portion. Media device 102 retrieves voice profile 106 of P1 100 from profile list 108. Audio processor 212, which may be part of media device 102, located at a remote server, or may be part of a media device used by another participant in the conference call, uses the retrieved voice profile of P1 100 to synthesize text portion 208 in the voice of P1 100. The resulting voice signal 214 is then transmitted into the conference call. Portion 210, which is not correspond to P1 100 or to any user that is relevant to the conference call, is not synthesized into a voice signal.

In some cases, the subject matter of each portion may be compared with a subject matter of the conference call to determine whether each portion is relevant to the conference call. For example, in some cases, more than one person may join a conference call from the same media device. If the portions of text spoken by each user are determined to be relevant to the conference call (based on subject, age of the user, etc.), each portion of text may be separately synthesized into a voice signal using a respective voice profile of each user. The voice signals are then separately transmitted into the conference call.

Figure 3:
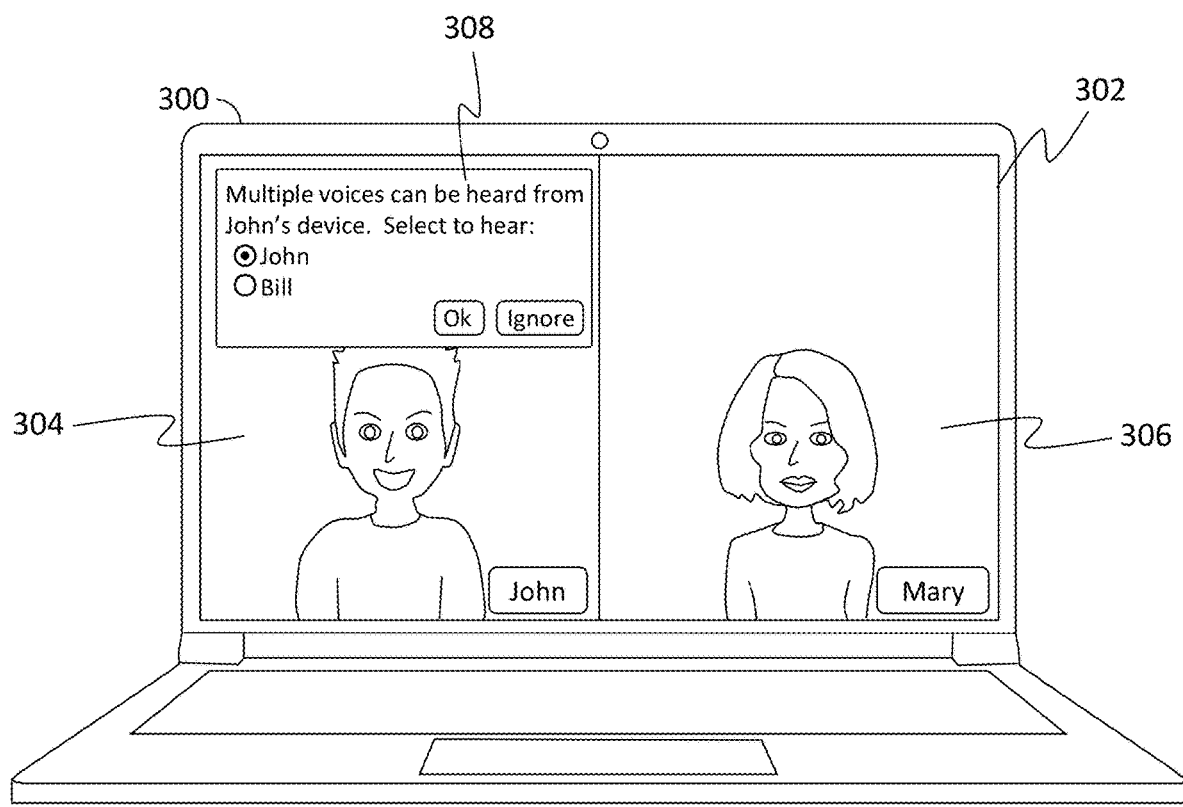
FIG. 3 shows an exemplary media device display and user interface element allowing a user to select to which of a plurality of voice signals being transmitted by the same media device into a conference call the user would like to listen, in accordance with some embodiments of the disclosure.

FIG. 3 shows an exemplary media device display and user interface element allowing a user to select to which of a plurality of voice signals being transmitted by the same media device into a conference call the user would like to listen, in accordance with some embodiments of the disclosure. Media device 300 displays a video conference call on display 302. Display 302 may be divided into sections for each other conference participant. For example, participant John is displayed in portion 304 and participant Mary is displayed in portion 306. If multiple voices are detected in an audio stream for John, dialog box 308 may be displayed. Dialog box 308 offers the user of media device 300 an option to select which voice in the audio stream from John the user of media device 300 wants to hear. Media device 300 may process the audio to transcribe and synthesize the portions of the audio stream from participant John to generate a voice signal for the selected voice. Alternatively, a remote server may perform the transcription and speech synthesis, or the media device used by John may perform these functions and separately transmit each voice signal into the conference call. As another alternative, the remote server may only transmit text to each participant's media device, and each participant's media device then performs the speech synthesis functions. This reduces the bandwidth needed for the conference call.

Figure 4:
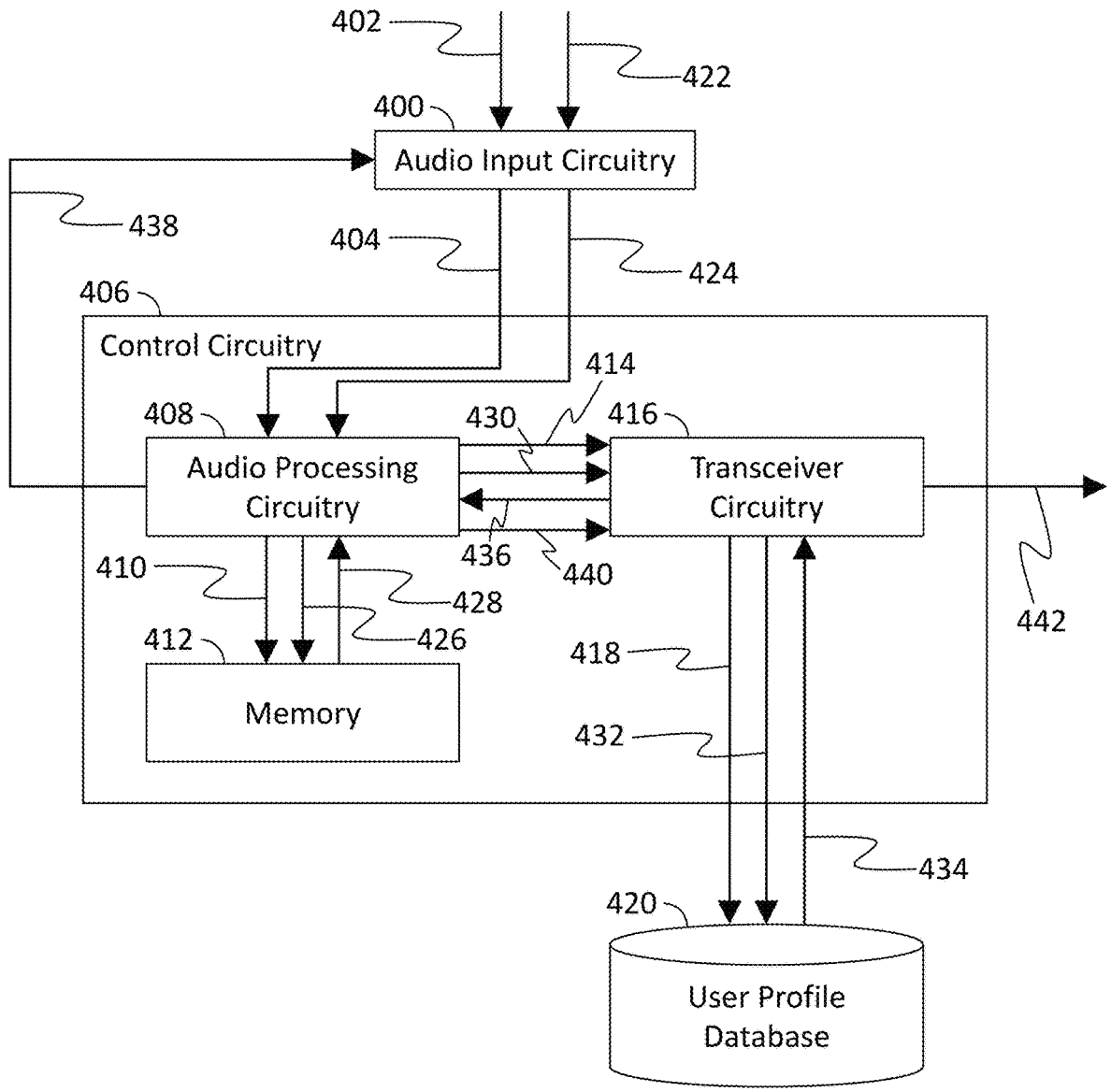
FIG. 4 is a block diagram showing components and data flow therebetween of a system for filtering unwanted sounds from a conference call, in accordance with some embodiments of the disclosure.

FIG. 4 is a block diagram showing components and data flow therebetween of a system for filtering unwanted sounds from a conference call, in accordance with some embodiments of the disclosure. Audio input circuitry 400 receives 402 a first voice signal during a first conference call. Audio input circuitry 400 may be part of a media device on which the system of the present disclosure is implemented, or may be a separate device, such as an Amazon Echo® or Google Home® device, or any other device capable of receiving and relaying user input to a media device. Audio input circuitry 400 may be a data interface such as a Bluetooth module, WiFi module, or other suitable data interface through which data entered on another device or audio data captured by another device can be received. Alternatively, audio input circuitry 400 may include a microphone through which audio information is captured directly. Audio input circuitry 400 may convert the audio to a digital format such as WAV. Audio input circuitry 400 transmits 404 the first voice signal to control circuitry 406. Control circuitry 406 may be based on any suitable processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexcore, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

The first voice signal is received by audio processing circuitry 408. Audio processing circuitry 408 may be any suitable circuitry configured to perform audio analysis functions, such as frequency domain analysis, level and gain analysis, harmonic distortion analysis, etc. Audio processing circuitry 408 analyzes the first voice signal to identify a base frequency of the voice represented by the first voice signal, as well as other voice characteristics such as pitch, intonation, accent, loudness, and rate. Audio processing circuitry 408 transmits 410 the base frequency and voice characteristics to memory 412 for storage in a voice profile associated with the user. In some embodiments, voice profiles are stored remotely. Audio processing circuitry 408 may therefore transmit 414 the base frequency and voice characteristics to transceiver circuitry 416. Transceiver circuitry 416 may be a network connection such as an Ethernet port, WiFi module, or any other data connection suitable for communicating with a remote server. Transceiver circuitry 416 then transmits 418 the base frequency and voice characteristics to user profile database 420.

During a second conference call in which the user is participating, subsequent to the first conference call, audio input circuitry 400 receives 422 a second voice signal. Audio input circuitry 400 transmits 424 the second voice signal to control circuitry 406, where audio processing circuitry 408 receives and analyzes the second voice signal. Audio processing circuitry 408 requests 426 the voice profile of the user from memory 412 and receives 428, in response to the request, the voice profile of the user. In embodiments where the voice profile is stored in a remote database, audio processing circuitry 408 transmits 430 the request to transceiver circuitry 416, which in turn transmits 432 the request to user profile database 420. In response, transceiver circuitry 416 receives 434 the requested voice profile of the user and in turn transmits 436 the voice profile of the user to audio processing circuitry 408.

Once the voice profile of the user has been retrieved, audio processing circuitry 408 compares the base frequency and voice characteristics of the voice represented by the second voice signal to the voice profile of the user. If the base frequency and voice characteristics of the second voice signal do not match the voice profile of the user, audio processing circuitry 408 prevents transmission of the second voice signal into the conference call. For example, audio processing circuitry 408 may transmit 438 a signal to audio input circuitry 400 to mute a microphone of audio input circuitry 400 for a predetermined period of time, such as five seconds. Alternatively, the signal may cause audio input circuitry 400 to stop transmitting audio data to control circuitry 406 for the predetermined period of time. The signal may be a data packet, which may require the transmission of a second data packet at the end of the predetermined period of time to reenable audio input circuitry 408. Alternatively, the signal may be a voltage level that remains constant at the signaling voltage level during the predetermined period of time, after which the level changes. At the end of the predetermined period of time, a third voice signal may be received. If the third voice signal still does not match the voice profile of the user, transmission may again be prevented for the predetermined period of time.

If the second voice signal does match the voice profile of the user, or if any subsequent voice signal received after transmission was prevented for the predetermined period of time, audio processing circuitry 408 transmits 440 the appropriate voice signal to transceiver circuitry 416. Transceiver circuitry 416 in turn transmits 442 the voice signal into the conference call.

Figure 5:
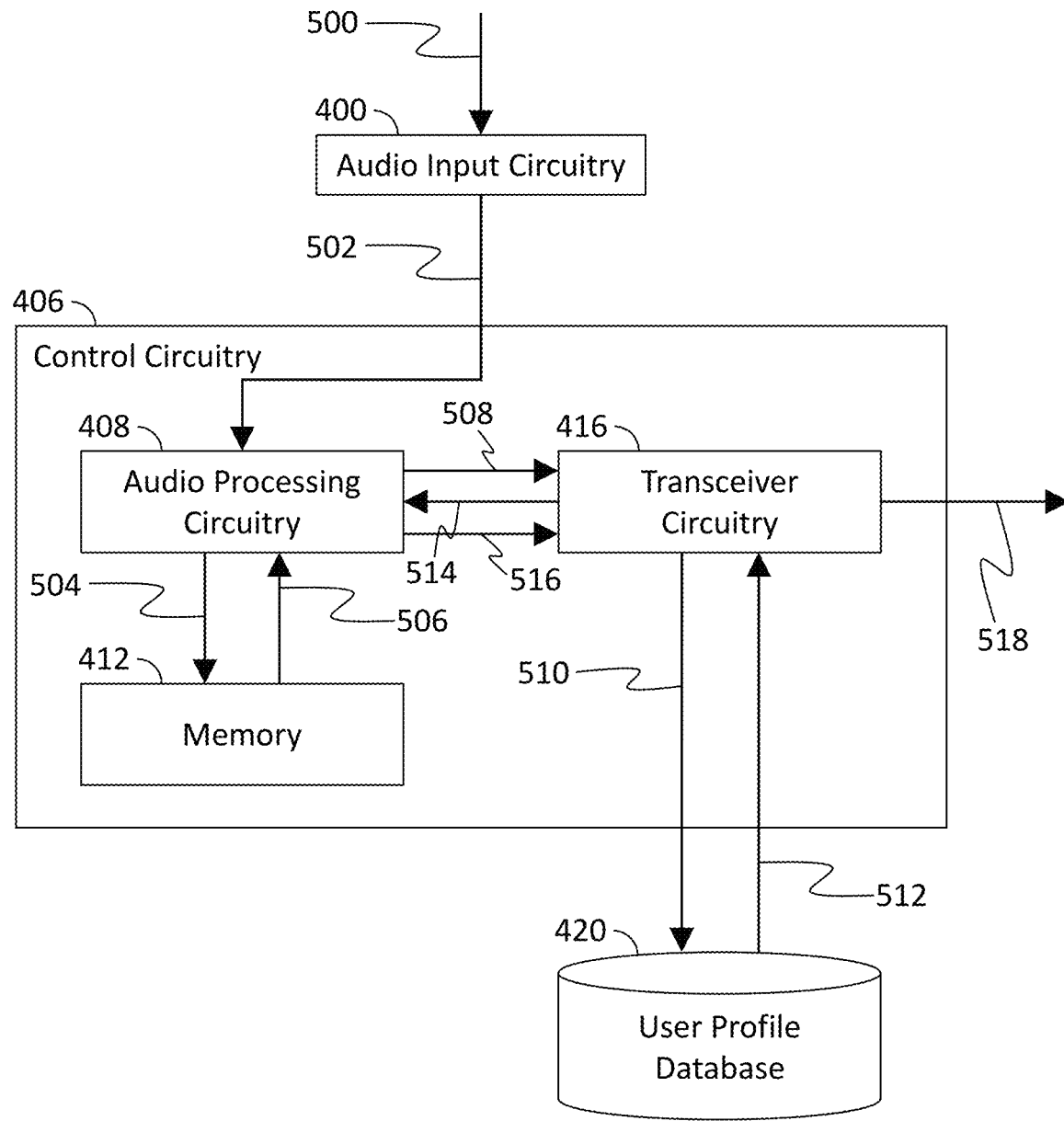
FIG. 5 is a block diagram showing components and data flow therebetween of a system for filtering unwanted sounds from a conference call using speech synthesis, in accordance with some embodiments of the disclosure.

FIG. 5 is a block diagram showing components and data flow therebetween of a system for filtering unwanted sounds from a conference call using speech synthesis, in accordance with some embodiments of the disclosure. Audio input circuitry 400 receives 500 a voice signal. Audio input circuitry 400 transmits 502 the voice signal to control circuitry 406 where it is received by audio processing circuitry 408. Audio processing circuitry 408 may include natural language processing circuitry. Audio processing circuitry 408 transcribes the voice signal into corresponding text and, using the natural language processing circuitry, identifies a subject of the text. Audio processing circuitry 408 then requests 504 and receives 506 a profile of the user from memory 412 that includes a list of subjects with which the user is familiar. If user profiles are stored remotely, audio processing circuitry 408 may transmit 508 the request for the user profile to transceiver circuitry 416, which in turn transmits 510 the request to user profile database 420. Transceiver circuitry 416 then receives 512, in response to the request, the user profile and in turn transmits 514 the user profile to audio processing circuitry 408. Audio processing circuitry 408 compares the subject of the text with the list of subjects with which the user is familiar. If the subject of the text matches a subject on the list, then audio processing circuitry 408 uses the voice profile of the user to synthesize a voice signal in the user's voice corresponding to the transcribed text. The synthesized voice signal is then transmitted 516 to transceiver circuitry 416 for transmission 518 into the conference call.

Figure 6:
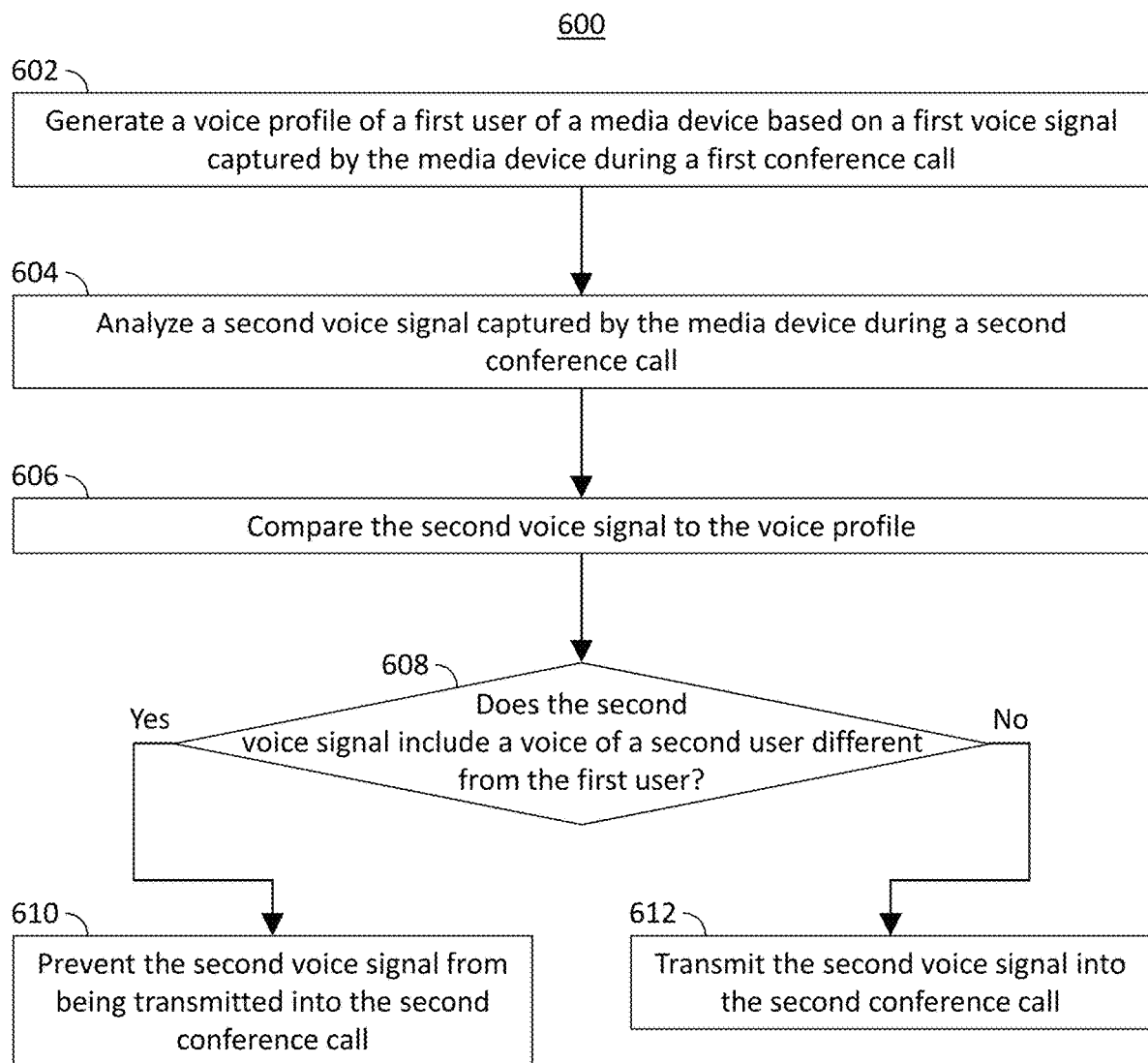
FIG. 6 is a flowchart representing a process for filtering unwanted sounds from a conference call, in accordance with some embodiments of the disclosure.

FIG. 6 is a flowchart representing an illustrative process 600 for filtering unwanted sounds from a conference call, in accordance with some embodiments of the disclosure. Process 600 may be implemented on control circuitry 406. In addition, one or more actions of process 600 may be incorporated into or combined with one or more actions of any other process or embodiment described herein.

At 602, control circuitry 406 generates a voice profile of a first user of a media device based on a first voice signal captured by the media device during a first conference call. The first voice signal may be captured by a microphone of the media device or may be captured by another device with which audio input circuitry 400 communicates. The first voice signal is analyzed by audio processing circuitry 408 to identify audio and voice characteristics of the first voice signal. The identified characteristics are stored in a voice profile of the user.

At 604, control circuitry 406, using audio processing circuitry 408, analyzes a second voice signal captured by the media device during a second conference call. At 606, control circuitry 406 compares the second voice signal to the voice profile. For example, control circuitry 406 compares the base frequency, pitch, intonation, and accent of the second voice signal with the base frequency, pitch, intonation, and accent stored in the voice profile. At 608, control circuitry 406 determines whether the second voice signal includes a voice of a second user different from the first user. For example, if the base frequency, pitch, intonation, and accent of the second voice signal do not match the voice profile of the user, then the second voice signal is determined to include a voice other than the voice of the first user.

If the second voice signal includes the voice of a second user ("Yes" at 608), then, at 610, control circuitry 406 prevents the second voice signal from being transmitted into the conference call. For example, control circuitry 406 may send a signal to audio input circuitry 400 to prevent the capture of voice signals or the transmission of captured voice signals to control circuitry 406 for a predetermined period of time, such as five seconds. Alternatively, control circuitry 406 may prevent audio processing circuitry 408 from transmitting voice signals into the conference call via transceiver circuitry 416. If, however, the second voice signal does not include the voice of a second user, but only the voice of the first user ("No" at 608), then, at 612, control circuitry 406 transmits the second voice signal into the conference call.

The actions and descriptions of FIG. 6 may be used with any other embodiment of this disclosure. In addition, the actions and descriptions described in relation to FIG. 6 may be done in suitable alternative orders or in parallel to further the purposes of this disclosure.

Figure 7:
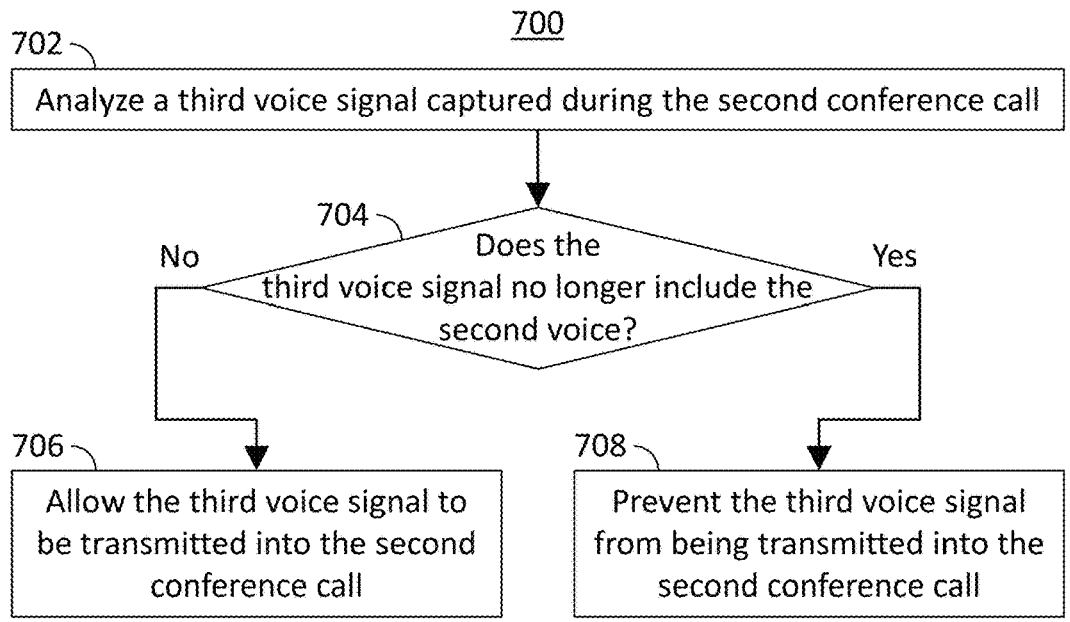
FIG. 7 is a flowchart representing a process for allowing transmission of audio into a conference call after detecting an unwanted sound, in accordance with some embodiments of the disclosure.

FIG. 7 is a flowchart representing an illustrative process 700 for allowing transmission of audio into a conference call after detecting an unwanted sound, in accordance with some embodiments of the disclosure. Process 700 may be implemented on control circuitry 406. In addition, one or more actions of process 700 may be incorporated into or combined with one or more actions of any other process or embodiment described herein.

At 702, control circuitry 406, using audio processing circuitry 408, analyzes a third voice signal captured during the second conference call. This may be a similar analysis to that described above in connection with FIG. 6. At 704, control circuitry 406 determines whether the third voice signal no longer includes the second voice. If not ("No" at 704), then, at 706, control circuitry 406 allows the third voice signal to be transmitted into the conference call. If the third voice signal still contains the second voice ("Yes" at 704), then, at 708, control circuitry 406 prevents the third voice signal from being transmitted into the conference call. This may be accomplished using methods described above in connections with FIGS. 4 and 6.

The actions and descriptions of FIG. 7 may be used with any other embodiment of this disclosure. In addition, the actions and descriptions described in relation to FIG. 7 may be done in suitable alternative orders or in parallel to further the purposes of this disclosure.

Figure 8:
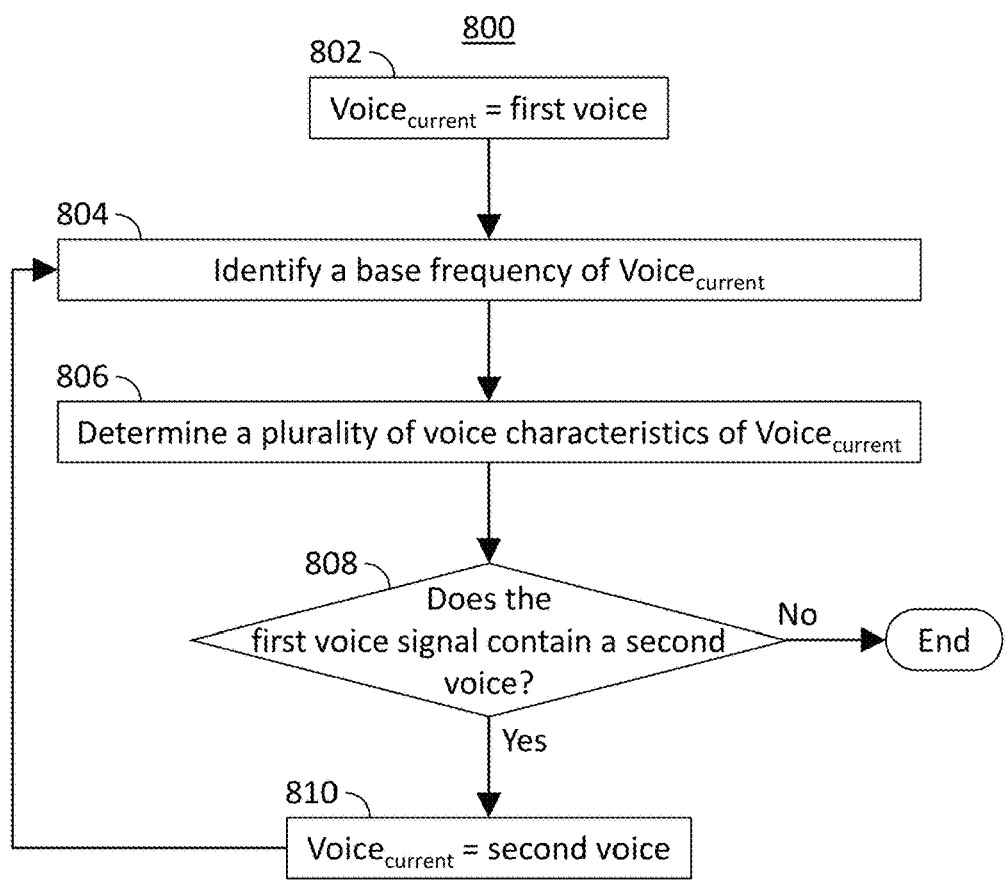
FIG. 8 is a flowchart representing a process for generating a voice profile of a user, in accordance with some embodiments of the disclosure.

FIG. 8 is a flowchart representing an illustrative process 800 for generating a voice profile of a user, in accordance with some embodiments of the disclosure. Process 800 may be implemented on control circuitry 406. In addition, one or more actions of process 800 may be incorporated into or combined with one or more actions of any other process or embodiment described herein.

At 802, control circuitry assigns a first captured voice to the variable $Voice_{current}$. At 804, control circuitry 406, using audio processing circuitry 408, identifies a base frequency of $Voice_{current}$. For example, control circuitry 406 may analyze a frequency spectrum of $Voice_{current}$ to determine a primary harmonic frequency of the voice. At 806, control circuitry 406 determines a plurality of voice characteristics, such as pitch, intonation, accent, loudness, and rate. For example, control circuitry 406 may compare vowel sounds spoken in $Voice_{current}$ with a set of known accents to determine an accent with which the speech represented by $Voice_{current}$ was spoken. Audio amplitude may be analyzed to determine loudness. Patterns of changes in loudness and frequency may be used to determine an intonation.

At 808, control circuitry 406 determines whether the first voice signal contains a second voice. For example, control circuitry 406 may determine if multiple base frequencies are present, or if words are spoken at different speeds. If so ("Yes" at 808), then, at 810, control circuitry 406 assigns the second voice to $Voice_{current}$, and the analysis described above is performed for the second voice. If not ("No" at 808), then the process ends.

The actions and descriptions of FIG. 8 may be used with any other embodiment of this disclosure. In addition, the actions and descriptions described in relation to FIG. 8 may be done in suitable alternative orders or in parallel to further the purposes of this disclosure.

Figure 9:
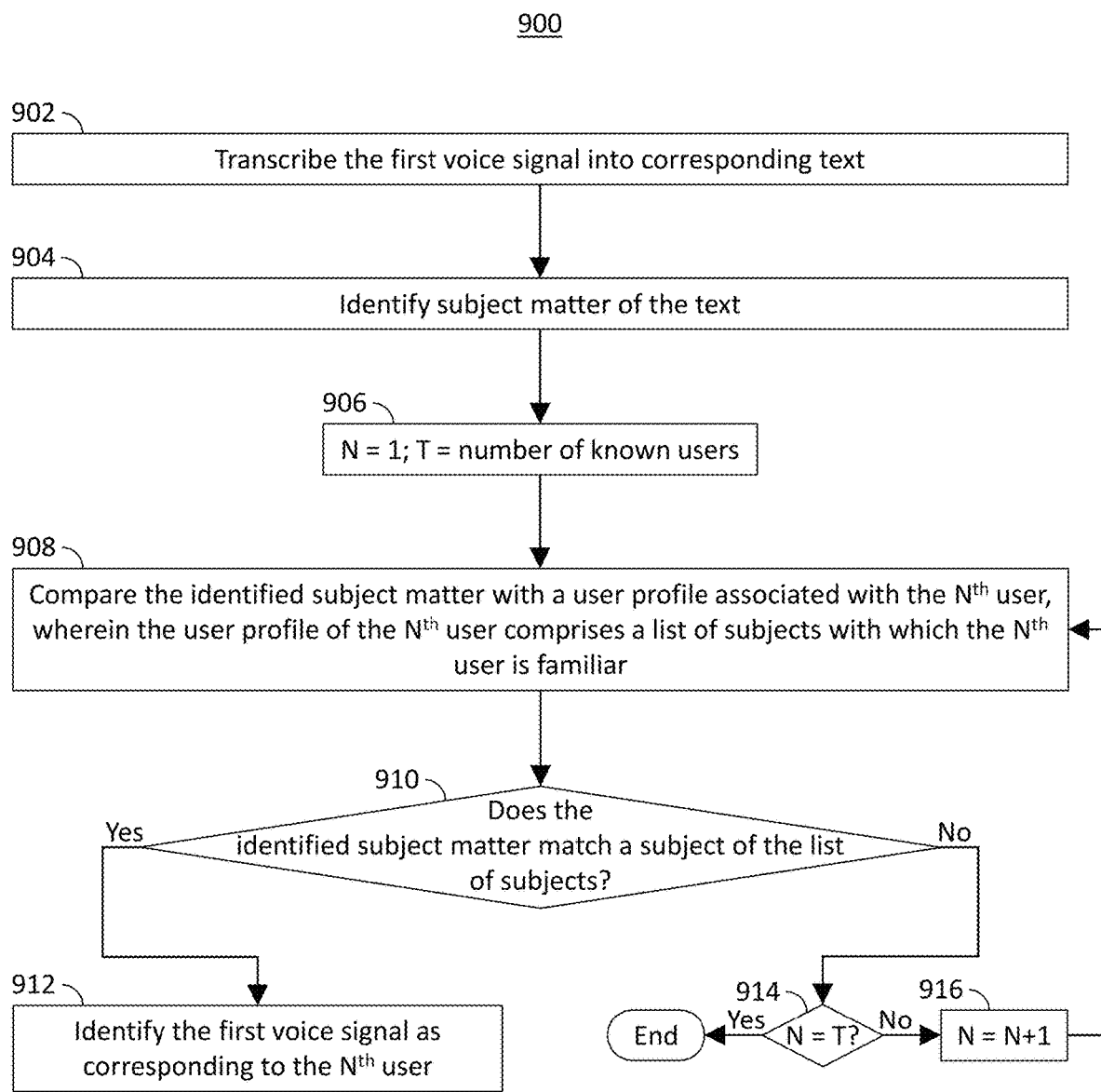
FIG. 9 is a flowchart representing a second process for generating a voice profile of a user, in accordance with some embodiments of the disclosure.

FIG. 9 is a flowchart representing a second illustrative process 900 for generating a voice profile of a user, in accordance with some embodiments of the disclosure. Process 900 may be implemented on control circuitry 406. In addition, one or more actions of process 900 may be incorporated into or combined with one or more actions of any other process or embodiment described herein.

At 902, control circuitry 406, using audio processing circuitry 408, transcribes the first voice signal into corresponding text. This may be accomplished using any suitable speech-to-text techniques. At 904, control circuitry 406, using natural language processing functions of audio processing circuitry 408, identifies a subject matter of the text. For example, audio processing circuitry 408 may identify a grammatical structure of a first sentence and identify a subject of the first sentence. Audio processing circuitry 408 may continue this process for each detected sentence until a number of sentence subjects have been identified. Audio processing circuitry 408 may process the identified subjects to determine a subject matter to which all identified sentence subjects correspond.

At 906, control circuitry 406 initializes a counter variable N, setting its value to one, and a variable T representing the number of known users for whom voice profiles have been stored. At 908, control circuitry 406 compares the identified subject matter with a user profile associated with the $N^{th}$ user. The user profile may include a list of subjects with which the $N^{th}$ user is familiar. At 910, control circuitry 406 determines, based on the comparing, whether the identified subject matter matches a subject of the list of subjects. For example, the text corresponding to the first voice signal may be "Based on these specifications, the device requires several independent processors." Control circuitry 406 may identify the words "specifications" and "processors" as relating to the subject of engineering. If so ("Yes" at 910), then, at 912, control circuitry 406 identifies the first voice signal as corresponding to the $N^{th}$ user. For example, control circuitry 406 may compare this identified subject to the listing of subjects for each known user and determine that the $N^{th}$ user is familiar with engineering. Based on this determination, control circuitry 406 identifies the first voice signal as corresponding to the $N^{th}$ user. If the identified subject matter does not match a subject of the list of subjects with which the $N^{th}$ user is familiar ("No" at 910), then, at 914, control circuitry 406 determines whether N is equal to T, meaning that the identified subject matter has been checked against the subject lists of all known users. If not ("No" at 914), then, at 916, control circuitry 406 increments the value of N by one, and processing returns to step 908. If so ("Yes" at 914), then, then process ends.

In order to determine if a user is familiar with an identified subject matter, control circuitry 406 may access a list of keywords associated with the identified subject matter. For example, if the identified subject matter is wireless networking, the list of keywords may include terms such as "WiFi," "Layer 2," "802.11," "packet," and "router." Control circuitry 406 may monitor a threshold amount of speech of the first user, such as five minutes, and determine a frequency with which the first user speaks any of the words of the keyword list. If the first user speaks words on the keyword list at greater than a threshold frequency, control circuitry 406 may determine that the first user is familiar with the subject matter.

The actions and descriptions of FIG. 9 may be used with any other embodiment of this disclosure. In addition, the actions and descriptions described in relation to FIG. 9 may be done in suitable alternative orders or in parallel to further the purposes of this disclosure.

Figure 10:
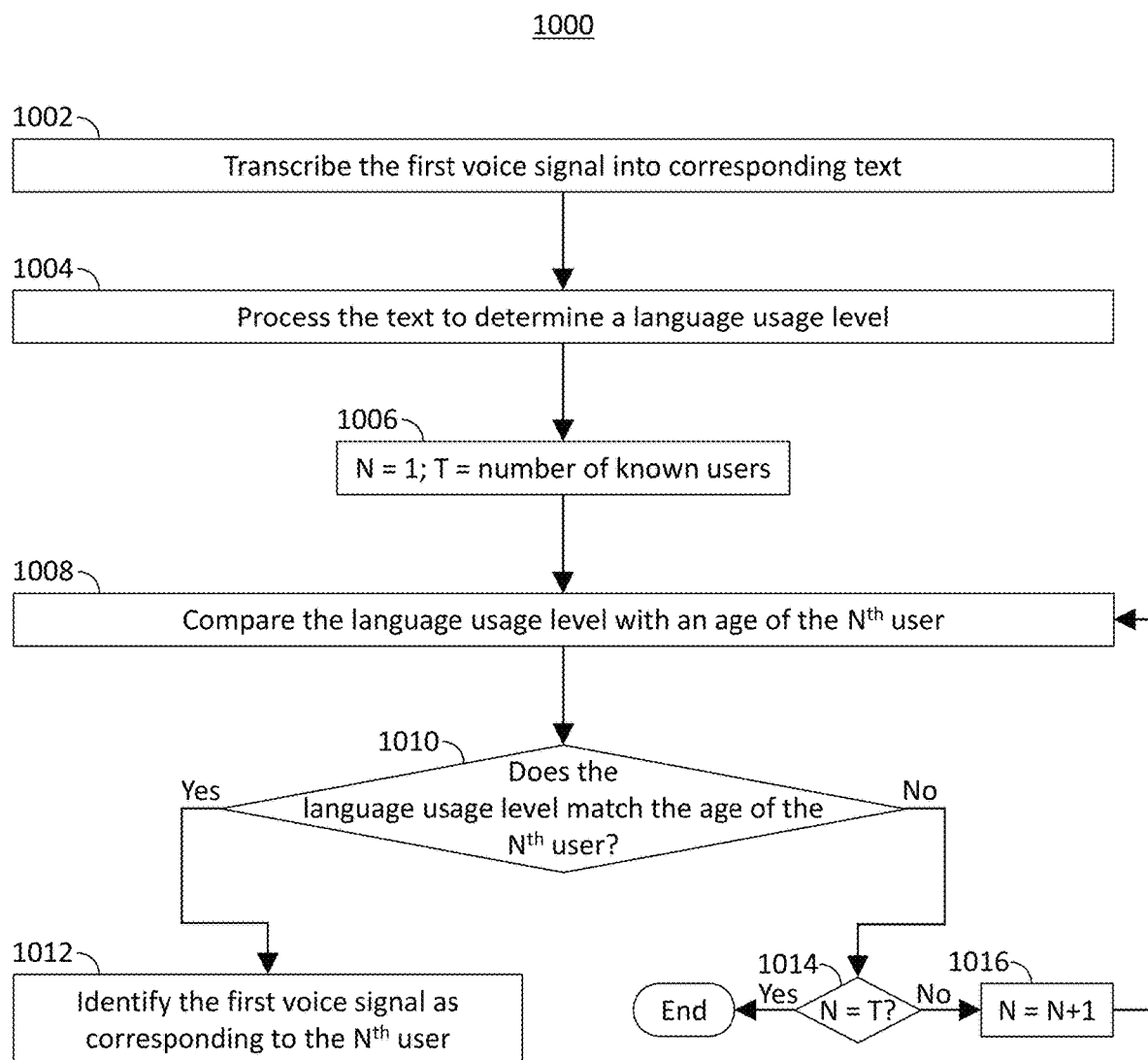
FIG. 10 is a flowchart representing a third process for generating a voice profile of a user, in accordance with some embodiments of the disclosure.

FIG. 10 is a flowchart representing a third illustrative process 1000 for generating a voice profile of a user, in accordance with some embodiments of the disclosure. Process 1000 may be implemented on control circuitry 406. In addition, one or more actions of process 1000 may be incorporated into or combined with one or more actions of any other process or embodiment described herein.

At 1002, control circuitry 406 transcribes the first voice signal into corresponding text. This may be accomplished using known speech-to-text techniques, as stated above. At 1004, control circuitry 406, using natural language processing functions of audio processing circuitry 408, processes the text to determine a language usage level. For example, audio processing circuitry 408 may analyze the size of each word, the simplicity of each word, grammatical structures, or the presence of filler words (e.g., "um," "uh," "er," etc.). If small or simple words are used, or if a large number of filler words are used close together, audio processing circuitry 408 may determine that the language usage level is low, meaning that the speaker of the words is most likely a child. If larger, more technical words are used, or if the grammatical structures used are more complex, audio processing circuitry 408 may determine that the language usage level is high.

At 1006, control circuitry 406 initializes a counter variable N, setting its value to one, and a variable T, representing the number of known users for whom voice profiles have been stored. At 1008, control circuitry 406 compares the language usage level with an age of the $N^{th}$ user. For example, a profile of the $N^{th}$ user may include age information. Control circuitry 406 may associate a particular language usage level with an age range. At 1010, control circuitry 406 determines, based on the comparison, whether the language usage level matches the age of the $N^{th}$ user. For example, if the age of the user falls within the age range associated with the language usage level, then the $N^{th}$ user's age matches the language usage level. If the $N^{th}$ user's age matches the language usage level ("Yes" at 1010), then, at 1012, control circuitry 406 identifies the first voice signal as corresponding to the $N^{th}$ user. If the language usage level does not match the age of the $N^{th}$ user ("No" at 1010), then, at 1014, control circuitry 406 determines whether N is equal to T, meaning that the language usage level have been compared to each known user. If not ("No" at 1014), then, at 1016, control circuitry 406 increments the value of N by one, and processing returns to step 1008. If so ("Yes" at 1014), then the process ends.

The actions and descriptions of FIG. 10 may be used with any other embodiment of this disclosure. In addition, the actions and descriptions described in relation to FIG. 10 may be done in suitable alternative orders or in parallel to further the purposes of this disclosure.

Figure 11:
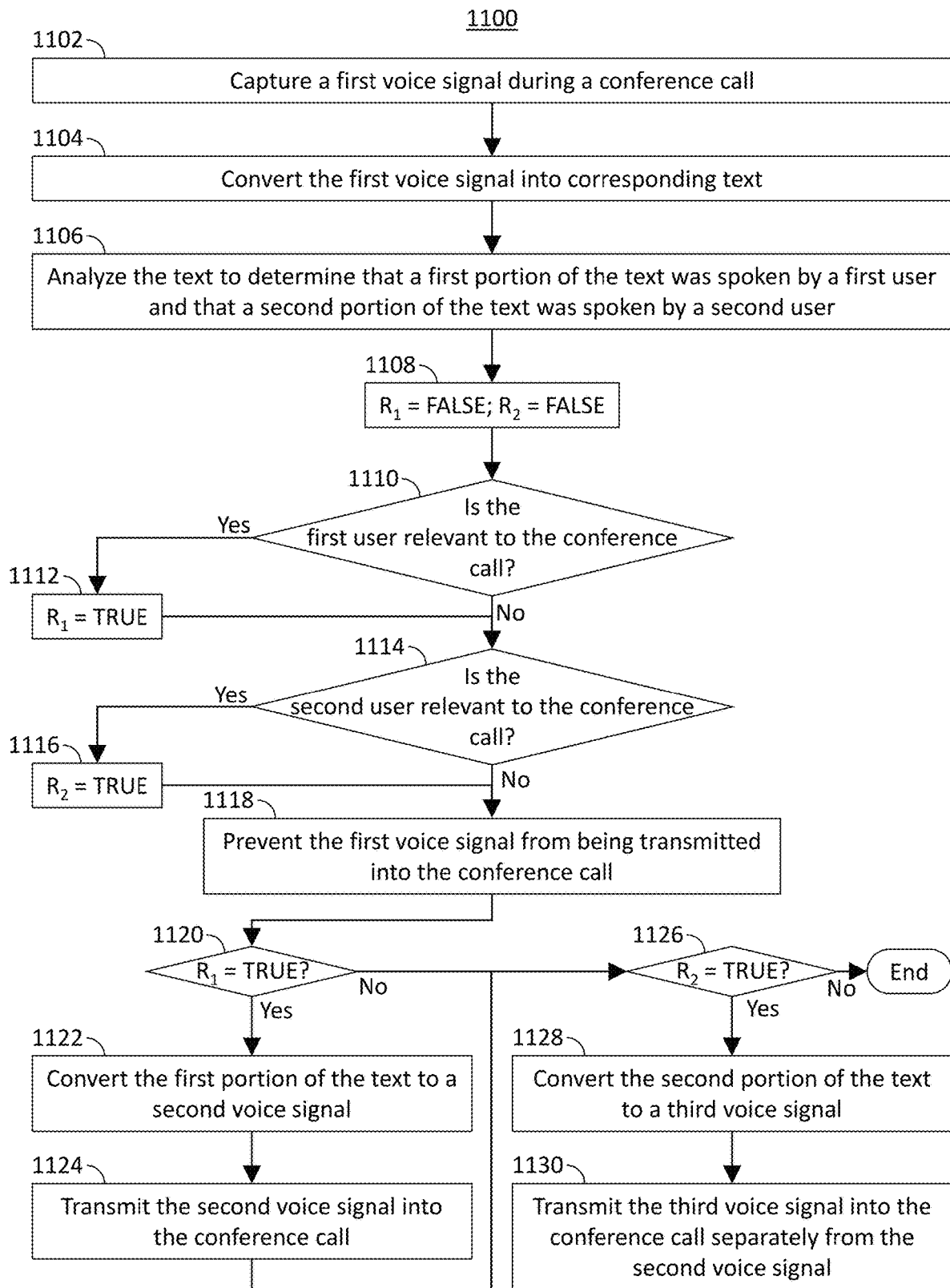
FIG. 11 is a flowchart representing a process for filtering unwanted sounds from a conference call using speech synthesis, in accordance with some embodiments of the disclosure.

FIG. 11 is a flowchart representing an illustrative process 1100 for filtering unwanted sounds from a conference call using speech synthesis, in accordance with some embodiments of the disclosure. Process 1100 may be implemented on control circuitry 406. In addition, one or more actions of process 1100 may be incorporated into or combined with one or more actions of any other process or embodiment described herein.

At 1102, control circuitry 406 captures a first voice signal during a first conference call. At 1104, control circuitry 406, using audio processing circuitry 408, converts the first voice signal into corresponding text, which may be accomplished using any known speech-to-text technique. At 1106, control circuitry 406 analyzes the text to determine that a first portion of the text was spoken by a first user and that a second portion of the text was spoken by a second user. For example, control circuitry 406, using audio processing circuitry 408, may determine that some words were spoken at a different frequency or with a different rate, accent, intonation, or pitch. Alternatively or additionally, using natural language processing functions of audio processing circuitry 408, control circuitry 406 may identify multiple language usage levels or multiple subjects within the text.

At 1108, control circuitry 406 initializes a first Boolean variable $R_1$, setting its value to FALSE, and a second Boolean variable $R_2$, also setting its value to FALSE. At 1110, control circuitry 406 determines whether the first user is relevant to the conference call. For example, control circuitry 406 may access data relating to the conference call, such as a meeting invitation, or metadata of the active conference call to determine a subject of the conference call. Control circuitry 406 then compares the portion of text spoken by the first user with the subject of the conference call. Alternatively, control circuitry 406 may determine whether the first user received an invitation to the conference call. For example, control circuitry 406 may access an email account or calendar of the first user to determine if any messages or entries relating to the conference call are present. If the first user is determined to be relevant to the conference call using any of these methods, then, at 1112, control circuitry 406 sets the value of $R_1$ to TRUE. Otherwise, the value of $R_1$ remains FALSE. In either case, processing proceeds to 1114, at which a similar determination is made for the second user. If the second user is determined to be relevant to the conference call, then, at 1114, control circuitry 406 sets the value of $R_2$ to TRUE. Otherwise, the value of $R_2$ remains FALSE. In either case, processing proceeds to 1118.

At 1118, control circuitry 406 prevents the first voice signal from being transmitted into the conference call. For example, control circuitry 406 may instruct audio processing circuitry 408 not to transmit the first voice signal to transceiver circuitry 416. At 1122, control circuitry 406 determines whether the $R_1$ is TRUE. If so ("Yes" at 1120), then, at 1122, control circuitry 406, using audio processing circuitry 408, converts the first portion of the text to a second voice signal. For example, audio processing circuitry 408 retrieves a voice profile of the first user and, using known text-to-speech techniques, synthesizes the first portion of the text to a corresponding voice signal in the voice of the first user. Then, at 1124, control circuitry 406 transmits the second voice signal into the conference call.

After transmitting the second voice signal into the conference call, or if $R_1$ is FALSE ("No" at 1120), at 1126, control circuitry 406 determines whether $R_2$ is TRUE. If so ("Yes" at 1126), then, at 1128, control circuitry 406, using audio processing circuitry 408, converts the second portion of the text to a third voice signal. For example, audio processing circuitry 408 retrieves a voice profile of the second user and, using known text-to-speech techniques, synthesizes the second portion of the text to a corresponding voice signal in the voice of the second user. Then, at 1130, control circuitry 406 transmits the third voice signal into the conference call. The second and third voice signal may be multiplexed together in a single transmission. If $R_2$ is FALSE ("No" at 1126), then the process ends.

The actions and descriptions of FIG. 11 may be used with any other embodiment of this disclosure. In addition, the actions and descriptions described in relation to FIG. 11 may be done in suitable alternative orders or in parallel to further the purposes of this disclosure.

Figure 12:
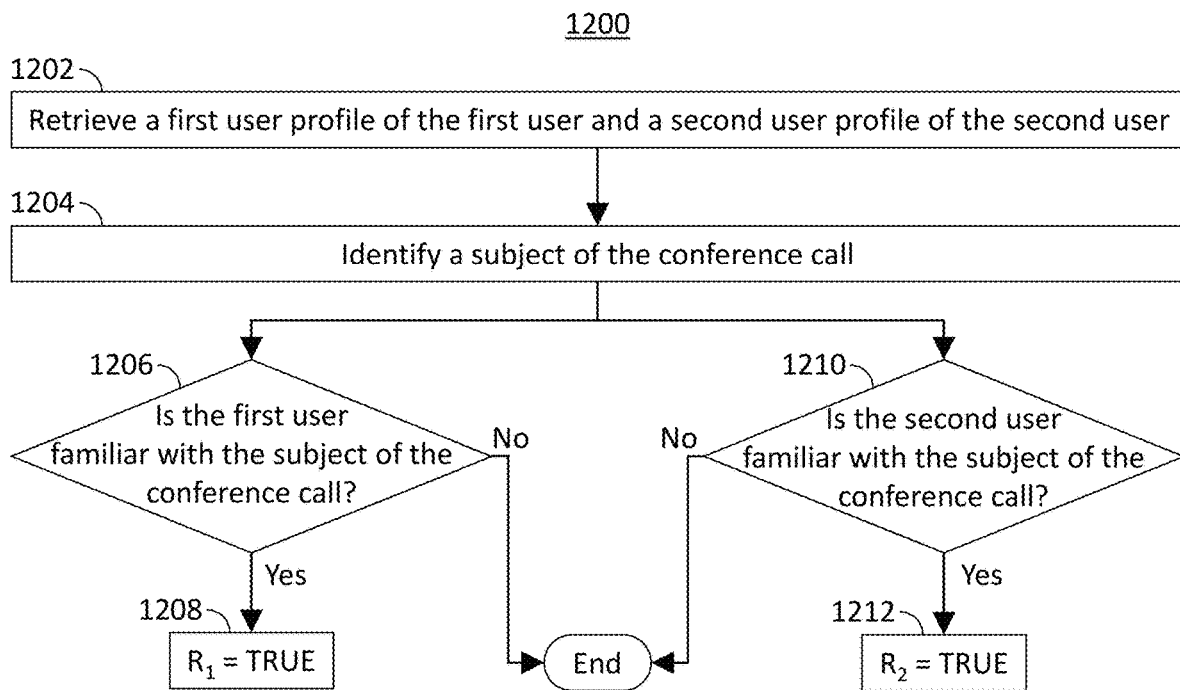
FIG. 12 is a flowchart representing a process for determining whether a user is relevant to a conference call, in accordance with some embodiments of the disclosure.

FIG. 12 is a flowchart representing an illustrative process 1200 for determining whether a user is relevant to a conference call, in accordance with some embodiments of the disclosure. Process 1200 may be implemented on control circuitry 406. In addition, one or more actions of process 1200 may be incorporated into or combined with one or more actions of any other process or embodiment described herein.

At 1202, control circuitry 406 retrieves a first user profile of the first user and a second user profile of the second user. At 1204, control circuitry 406 identifies a subject of the conference call. For example, control circuitry 406 may access metadata of the conference call or meeting invitation data from an email account or calendar of a user. At 1206, control circuitry 1206 determines whether the first user is familiar with the subject of the conference call. For example, the first user profile may include a list of subjects with which the first user is familiar. Control circuitry 406 may determine if the identified subject of the conference call is contained in the list of subjects. If the first user is familiar with the subject of the conference call ("Yes" at 1206), then, at 1208, control circuitry 406 sets the value of $R_1$ to TRUE. At 1210, control circuitry 406 also determines whether the second user is familiar with the subject of the conference call using similar methods. If so ("Yes" at 1210), then, at 1212, control circuitry 406 sets the value of $R_2$ to TRUE.

The actions and descriptions of FIG. 12 may be used with any other embodiment of this disclosure. In addition, the actions and descriptions described in relation to FIG. 12 may be done in suitable alternative orders or in parallel to further the purposes of this disclosure.

Figure 13:
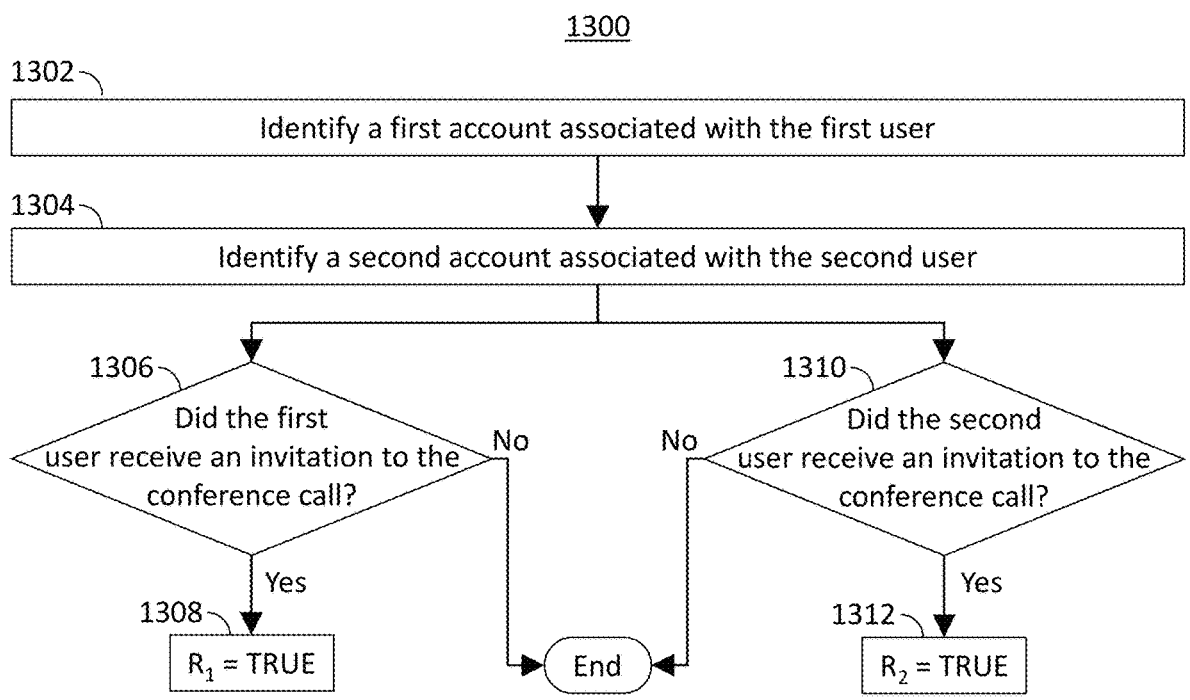
FIG. 13 is a flowchart representing a second process for determining whether a user is relevant to a conference call.

FIG. 13 is a flowchart representing a second illustrative process 1300 for determining whether a user is relevant to a conference call, in accordance with some embodiments of the disclosure. Process 1300 may be implemented on control circuitry 406. In addition, one or more actions of process 1300 may be incorporated into or combined with one or more actions of any other process or embodiment described herein.

At 1302, control circuitry 406 identifies a first account associated with the first user. For example, control circuitry 406 may identify an email account, calendar account, social media account, or other account or profile of the first user. At 1304, control circuitry 406 identifies a second account associated with the second user. This may be similar to the first account of the first user. At 1306, control circuitry 406 determines whether the first user received an invitation to the conference call. For example, control circuitry 406 may determine if the identified account contains an entry or message identifying the conference call in particular, or a meeting taking place at the same time as the conference call in general. If the first user received an invitation to the conference call ("Yes" at 1306), then, at 1308, control circuitry 406 sets the value of $R_1$ to TRUE. At 1310, control circuitry 406 also determines whether the second user received an invitation to the conference call using similar methods. If so ("Yes" at 1310), then, at 1312, control circuitry 406 sets the value of $R_2$ to TRUE.

The actions and descriptions of FIG. 13 may be used with any other embodiment of this disclosure. In addition, the actions and descriptions described in relation to FIG. 13 may be done in suitable alternative orders or in parallel to further the purposes of this disclosure.

Figure 14:
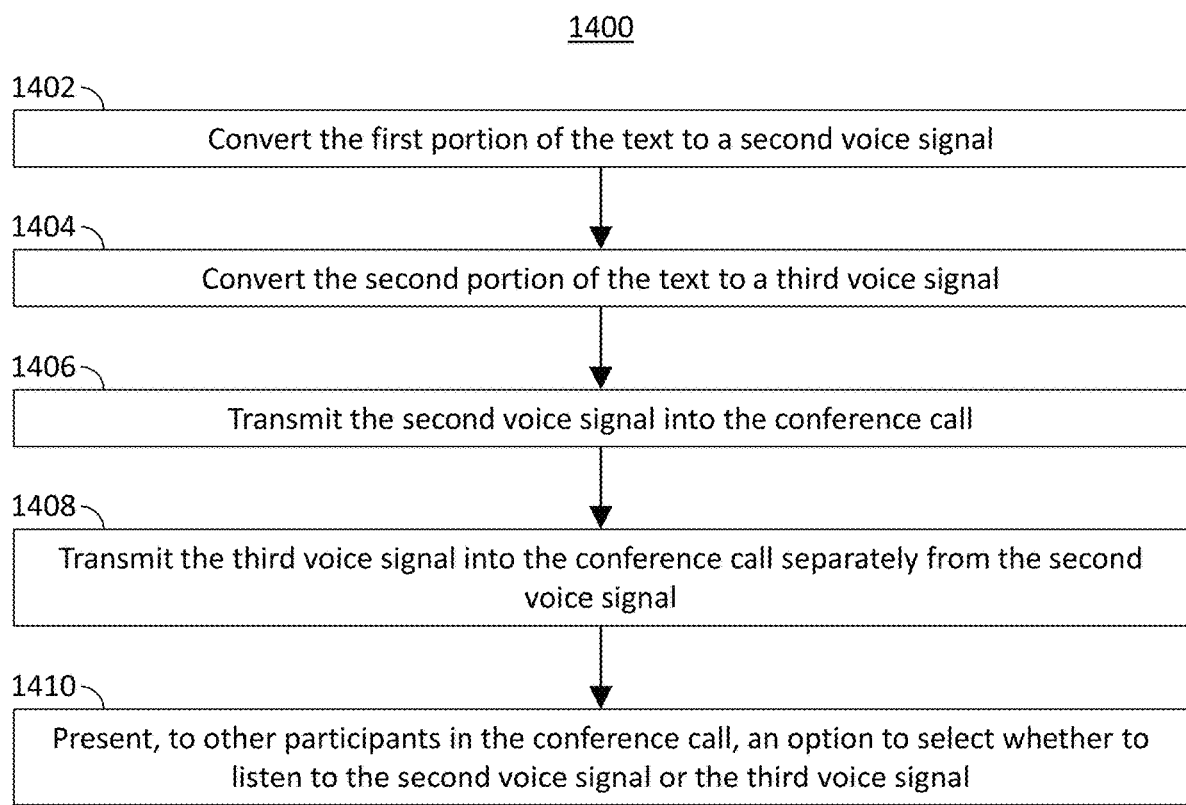
FIG. 14 is a flowchart representing a process for presenting participants in a conference call with an option to select to listen to one of two voice signals, in accordance with some embodiments of the disclosure.

FIG. 14 is a flowchart representing an illustrative process 1400 for presenting participants in a conference call with an option to select to listen to one of two voice signals, in accordance with some embodiments of the disclosure. Process 1400 may be implemented on control circuitry 406. In addition, one or more actions of process 1400 may be incorporated into or combined with one or more actions of any other process or embodiment described herein.

At 1402, control circuitry 406 converts the first portion of the text into a second voice signal and, at 1404, converts the second portion of the text into a third voice signal. These actions may be accomplished using methods described above in connection with FIG. 11. At 1406, control circuitry 406 transmits the second voice signal into the conference call and, at 1408, transmits the third voice signal into the conference call, separately from the second voice signal. At 1410, an option is presented to other participants in the conference call to select whether to listen to the second voice signal or the third voice signal. For example, an icon or avatar of each of the first and second users may be displayed to other participants. Selection of the icon or avatar of one user will cause the appropriate voice signal to be played.

The actions and descriptions of FIG. 14 may be used with any other embodiment of this disclosure. In addition, the actions and descriptions described in relation to FIG. 14 may be done in suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
capturing a voice signal, by a device, during a communication session;
determining that the voice signal includes a voice of a first user and a voice of a second user, wherein the second user is different from the first user;
determining, using a first voice profile of the first user, portions of the voice signal spoken by the first user;
determining, using a second voice profile of the second user, portions of the voice signal spoken by the second user;
identifying a subject of the communication session;
in response to determining: (a) that the first user is familiar with the subject of the communication session using a first user profile associated with the first user, and (b) that the second user is not familiar with the subject of the communication session using a second user profile associated with the second user:
transmitting into the communication session the portions of the voice signal spoken by the first user while preventing transmission into the communication session of the portions of the voice signal spoken by the second user.

2. The method of claim 1, further comprising:
generating the first voice profile of the first user based on a prior voice signal captured during a prior communication session.

3. The method of claim 1, wherein the voice signal is a first voice signal, and wherein the transmitting into the communication session the portions of the first voice signal spoken by the first user while preventing transmission into the communication session of the portions of the first voice signal spoken by the second user comprises:
constructing a second voice signal based on the portions of the first voice signal spoken by the first user; and
transmitting the second voice signal into the communication session.

4. The method of claim 3, wherein the constructing the second voice signal based on the portions of the first voice signal spoken by the first user comprises:
accessing the first voice profile of the first user; and
synthesizing the portions of the first voice signal spoken by the first user into the second voice signal based on the first voice profile of the first user.

5. The method of claim 2, wherein the generating the first voice profile of the first user based on the prior voice signal captured during the prior communication session comprises:
identifying a base frequency of the prior voice signal;
determining a plurality of voice characteristics of the prior voice signal; and
storing, in association with the first user, the base frequency and the plurality of voice characteristics.

6. The method of claim 5, wherein the plurality of voice characteristics includes at least one characteristic selected from a group consisting of pitch, intonation, accent, loudness, and rate.

7. The method of claim 1, wherein the determining that the first user is familiar with the subject of the communication session using the first user profile associated with the first user comprises:
transcribing the voice signal into corresponding text;
identifying a subject matter of the text;
comparing the identified subject matter with the first user profile associated with the first user, wherein the first user profile of the first user comprises a list of subjects with which the first user is familiar;
determining, based on the comparing, whether the identified subject matter matches a subject of the list of subjects; and
in response to determining that the identified subject matter matches the subject of the list of subjects, determining that the first user is familiar with the subject of the communication session.

8. The method of claim 1 wherein the transmitting into the communication session the portions of the voice signal spoken by the first user while preventing transmission into the communication session of the portions of the voice signal spoken by the second user further comprises:
transcribing the voice signal into corresponding text;
processing the text to determine a language usage level;
comparing the language usage level with an age of the first user;
determining, based on the comparing, that the language usage level matches the age of the first user.

9. The method of claim 2, wherein generating the first voice profile of the first user based on the prior voice signal captured during the prior communication session comprises:
transcribing the prior voice signal into corresponding text;
identifying a subject matter of the text;
comparing the identified subject matter with the first user profile associated with the first user, wherein the first user profile of the first user comprises a list of subjects with which the first user is familiar;
determining, based on the comparing, whether the identified subject matter matches a subject of the list of subjects; and
in response to determining that the identified subject matter matches the subject of the list of subjects, identifying the prior voice signal as corresponding to the first user.

10. The method of claim 2, wherein generating the first voice profile of the first user based on the prior voice signal captured during the prior communication session comprises:
- transcribing the prior voice signal into corresponding text;
- processing the text to determine a language usage level;
- comparing the language usage level with an age of the first user;
- determining, based on the comparing, whether the language usage level matches the age of the first user; and
- in response to determining that the language usage level matches the age of the first user, identifying the prior voice signal as corresponding to the first user.

11. A system comprising:
- input/output circuitry;
- audio input circuitry configured to capture a voice signal, by a device, during a communication session; and
- control circuitry configured to:
  - determine that the voice signal includes a voice of a first user and a voice of a second user, wherein the second user is different from the first user;
  - determine, using a first voice profile of the first user, portions of the voice signal spoken by the first user;
  - determine, using a second voice profile of the second user, portions of the voice signal spoken by the second user;
  - identify a subject of the communication session; and
- wherein the input/output circuitry is configured to:
  - in response to determining, via the control circuitry: (a) that the first user is familiar with the subject of the communication session using a first user profile associated with the first user, and (b) that the second user is not familiar with the subject of the communication session using a second user profile associated with the second user:
    - transmit, into the communication session, the portions of the voice signal spoken by the first user while preventing transmission into the communication session of the portions of the voice signal spoken by the second user.

12. The system of claim 11, wherein the control circuitry is further configured to generate the first voice profile of the first user based on a prior voice signal captured during a prior communication session.

13. The system of claim 11, wherein the voice signal is a first voice signal, and wherein the input/output circuitry is configured to transmit into the communication session the portions of the first voice signal spoken by the first user while preventing transmission into the communication session of the portions of the first voice signal spoken by the second user, by:
- constructing, via the control circuitry, a second voice signal based on the portions of the first voice signal spoken by the first user; and
- transmitting the second voice signal into the communication session.

14. The system of claim 13, wherein the control circuitry is configured to construct the second voice signal based on the portions of the first voice signal spoken by the first user by:
- accessing the first voice profile of the first user; and
- synthesizing the portions of the first voice signal spoken by the first user into the second voice signal based on the first voice profile of the first user.

15. The system of claim 12, wherein the control circuitry is configured to generate the first voice profile of the first user based on the prior voice signal captured during the prior communication session by:
- identifying a base frequency of the prior voice signal;
- determining a plurality of voice characteristics of the prior voice signal; and
- storing, in association with the first user, the base frequency and the plurality of voice characteristics.

16. The system of claim 15, wherein the plurality of voice characteristics includes at least one characteristic selected from a group consisting of pitch, intonation, accent, loudness, and rate.

17. The system of claim 11, wherein the control circuitry is configured to determine that the first user is familiar with the subject of the communication session using the first user profile associated with the first user by:
- transcribing the voice signal into corresponding text;
- identifying a subject matter of the text;
- comparing the identified subject matter with the first user profile associated with the first user, wherein the first user profile of the first user comprises a list of subjects with which the first user is familiar;
- determining, based on the comparing, whether the identified subject matter matches a subject of the list of subjects; and
- in response to determining that the identified subject matter matches the subject of the list of subjects, determining that the first user is familiar with the subject of the communication session.

18. The system of claim 11, wherein the control circuitry, when transmitting into the communication session the portions of the voice signal spoken by the first user while preventing transmission into the communication session of the portions of the voice signal spoken by the second user, is further configured to:
- transcribe the voice signal into corresponding text;
- process the text to determine a language usage level;
- compare the language usage level with an age of the first user;
- determine, based on the comparing, that the language usage level matches the age of the first user.

19. The system of claim 12, wherein the control circuitry is configured to generate the first voice profile of the first user based on the prior voice signal captured during the prior communication session by:
- transcribing the prior voice signal into corresponding text;
- identifying a subject matter of the text;
- comparing the identified subject matter with the first user profile associated with the first user, wherein the first user profile of the first user comprises a list of subjects with which the first user is familiar;
- determining, based on the comparing, whether the identified subject matter matches a subject of the list of subjects; and
- in response to determining that the identified subject matter matches the subject of the list of subjects, identifying the prior voice signal as corresponding to the first user.

20. The system of claim 12, wherein the control circuitry is configured to generate the first voice profile of the first user based on the prior voice signal captured during the prior communication session by:
- transcribing the prior voice signal into corresponding text;
- processing the text to determine a language usage level;
- comparing the language usage level with an age of the first user;
- determining, based on the comparing, whether the language usage level matches the age of the first user; and in response to determining that the language usage level matches the age of the first user, identifying the prior voice signal as corresponding to the first user.

* * * * *